(12) United States Patent
Chishti

(10) Patent No.: US 9,774,740 B2
(45) Date of Patent: Sep. 26, 2017

(54) TECHNIQUES FOR BENCHMARKING PAIRING STRATEGIES IN A CONTACT CENTER SYSTEM

(71) Applicant: Afiniti Europe Technologies Limited, Cheshire (GB)

(72) Inventor: Zia Chishti, Washington, DC (US)

(73) Assignee: Afiniti Europe Technologies Limited, Cheshire (GB)

( * ) Notice: Subject to any disclaimer, the term of this patent is extended or adjusted under 35 U.S.C. 154(b) by 0 days.

(21) Appl. No.: 15/221,698

(22) Filed: Jul. 28, 2016

(65) Prior Publication Data

US 2017/0208176 A1 Jul. 20, 2017

Related U.S. Application Data

(63) Continuation-in-part of application No. 15/131,915, filed on Apr. 18, 2016, now Pat. No. 9,712,676.
(Continued)

(51) Int. Cl.
*H04M 3/00* (2006.01)
*H04M 5/00* (2006.01)
(Continued)

(52) U.S. Cl.
CPC ....... *H04M 3/5232* (2013.01); *H04M 3/5141* (2013.01)

(58) Field of Classification Search
CPC ................ H04M 3/5232; H04M 3/5141
(Continued)

(56) References Cited

U.S. PATENT DOCUMENTS

| 5,155,763 A | 10/1992 | Bigus et al. |
| 5,206,903 A | 4/1993 | Kohler et al. |

(Continued)

FOREIGN PATENT DOCUMENTS

| AU | 2008349500 C1 | 5/2014 |
| AU | 2009209317 B2 | 5/2014 |

(Continued)

OTHER PUBLICATIONS

Anonymous. (2006) "Performance Based Routing in Profit Call Centers," The Decision Makers' Direct, located at www.decisioncraft.com, Issue Jan. 6, 2012 (3 pages).
(Continued)

*Primary Examiner* — Quynh Nguyen
(74) *Attorney, Agent, or Firm* — Wilmer Cutler Pickering Hale and Dorr LLP

(57) ABSTRACT

Techniques for benchmarking pairing strategies in a contact center system are disclosed. In one particular embodiment, the techniques may be realized as a method for benchmarking pairing strategies in a contact center system comprising: cycling, by at least one processor configured for contact center operations, among at least two pairing strategies; and determining, by the at least one processor, a difference in performance between the at least two pairing strategies, wherein at least one contact was paired in a sequence of contact interactions to reach a final outcome during a final contact interaction of the sequence of contact interactions.

20 Claims, 7 Drawing Sheets

Related U.S. Application Data which is a continuation-in-part of application No. 14/727,271, filed on Jun. 1, 2015, which is a continuation of application No. 14/472,998, filed on Aug. 29, 2014, now Pat. No. 9,215,323, which is a continuation of application No. 12/266,446, filed on Nov. 6, 2008, now Pat. No. 8,824,658, said application No. 15/131,915 is a continuation-in-part of application No. 12/021,251, filed on Jan. 28, 2008.

(51) Int. Cl.
H04M 3/523 (2006.01)
H04M 3/51 (2006.01)

(58) Field of Classification Search
USPC .......................... 379/265.12, 265.11, 265.09
See application file for complete search history.

(56) References Cited

U.S. PATENT DOCUMENTS

| | | |
|---|---|---|
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,879,715 B2 | 11/2014 | Spottiswoode et al. |
| 8,903,079 B2 | 12/2014 | Xie et al. |
| 8,929,537 B2 | 1/2015 | Chishti et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,277,055 B2 | 3/2016 | Spottiswoode et al. |
| 9,300,802 B1 | 3/2016 | Chishti |
| 9,426,296 B2 | 8/2016 | Chishti et al. |
| 2001/0032120 A1 | 10/2001 | Stuart et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |

(56) References Cited

U.S. PATENT DOCUMENTS

| | | |
|---|---|---|
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0256955 A1* | 11/2006 | Laughlin ............ H04M 3/5237 379/266.01 |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1* | 4/2010 | Brussat ............ H04M 3/5233 379/265.12 |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0251137 A1 | 9/2013 | Chishti et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0341370 A1 | 11/2014 | Li et al. |
| 2015/0055772 A1 | 2/2015 | Klemm et al. |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| JP | 11-098252 A | 4/1999 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649575 B2 | 1/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-99/17517 A1 | 4/1999 |
| WO | WO-01/63894 A2 | 8/2001 |
| WO | WO-2006/124113 A2 | 11/2006 |
| WO | WO-2010/053701 A2 | 5/2010 |
| WO | WO-2011/081514 A1 | 7/2011 |

OTHER PUBLICATIONS

Canadian Office Action issued in Canadian Patent Application No. 2713526, dated Oct. 25, 2016, 7 pages.
Cleveland, William S., "Robust Locally Weighted Regression and Smoothing Scatterplots," Journal of the American Statistical Association, vol. 74, No. 368, pp. 829-836 (Dec. 1979).
Gans, N. et al. (2003), "Telephone Call Centers: Tutorial, Review and Research Prospects," Manufacturing & Service Operations Management, vol. 5, No. 2, pp. 79-141.
International Search Report and Written Opinion issued by the European Patent Office as International Searching Authority for International Application No. PCT/IB2016/001762 dated Feb. 20, 2017 (15 pages).

(56) References Cited

OTHER PUBLICATIONS

International Preliminary Report on Patentability issued in connection with PCT Application No. PCT/US2009/066254 mailed Jun. 14, 2011 (6 pages).
International Search Report and Written Opinion issued by the European Patent Office as International Searching Authority for International Application No. PCT/IB2016/001776 dated Mar. 3, 2017 (16 pages).
International Search Report issued in connection with International Application No. PCT/US13/33268 mailed May 31, 2013 (2 pages).
International Search Report issued in connection with PCT Application No. PCT/US/2009/054352 mailed Mar. 12, 2010, 5 pages.
International Search Report issued in connection with PCT Application No. PCT/US2008/077042 mailed Mar. 13, 2009 (3 pages).
International Search Report issued in connection with PCT Application No. PCT/US2009/031611 mailed Jun. 3, 2009 (5 pages).
International Search Report issued in connection with PCT Application No. PCT/US2009/066254 mailed Feb. 24, 2010 (4 pages).
International Search Report issued in connection with PCT/US2009/061537 mailed Jun. 7, 2010 (5 pages).
International Search Report issued in connection with PCT/US2013/033261 mailed Jun. 14, 2013 (3 pages).
International Search Report issued in connection with PCT/US2013/33265 mailed Jul. 9, 2013 (2 pages).
Japanese Office Action issued by the Japan Patent Office for Application No. 2015-503396 dated Jun. 29, 2016 (7 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Ntzoufras, "Bayesian Modeling Using Winbugs". Wiley Interscience, Chapter 5, Normal Regression Models, Oct. 18, 2007, pp. 155-220 (67 pages).
Press, W. H. and Rybicki, G. B., "Fast Algorithm for Spectral Analysis of Unevenly Sampled Data," The Astrophysical Journal, vol. 338, pp. 277-280 (Mar. 1, 1989).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32. Feb. 2008; retrieved from http://userwww.sfsu.edu/saltzman/Publist.html.
Subsequent Substantive Examination Report ssued in connection with Philippines Application No. 1-2010-501705 mailed Jul. 14, 2014 (1 page).
Substantive Examination Report issued in connection with Philippines Application No. 1/2011/500868 dated May 2, 2014 (1 page).
Written Opinion of the International Searching Aurhority issued in connection with PCT Application No. PCT/US2008/077042 mailed Mar. 13, 2009, 6 pages.
Written Opinion of the International Searching Authority issued in connection with International Application No. PCT/US13/33268 mailed May 31, 2013, 7 pages.
Written Opinion of the International Searching Authority issued in connection with PCT Application No. PCT/US/2009/054352 mailed Mar. 12, 2010, 5 pages.
Written Opinion of the International Searching Authority issued in connection with PCT Application No. PCT/US2009/031611 mailed Jun. 3, 2009, 7 pages.
Written Opinion of the International Searching Authority issued in connection with PCT Application No. PCT/US2009/066254 mailed Feb. 24, 2010, 5 pages.
Written Opinion of the International Searching Authority issued in connection with PCT/US2009/061537 mailed Jun. 7, 2010, 10 pages.
Written Opinion of the International Searching Authority issued in connection with PCT/US2013/033261 mailed Jun. 14, 2013, 7 pages.
Written Opinion of the International Searching Authority issued in connection with PCT/US2013/33265 mailed Jul. 9, 2013, 7 pages.

\* cited by examiner

TECHNIQUES FOR BENCHMARKING PAIRING STRATEGIES IN A CONTACT CENTER SYSTEM

CROSS-REFERENCE TO RELATED APPLICATIONS

This application is a continuation-in-part of U.S. patent application Ser. No. 15/131,915, filed Apr. 18, 2016, which is a continuation-in-part of U.S. patent application Ser. No. 12/021,251, filed Jan. 28, 2008, and which is a continuation-in-part of U.S. patent application Ser. No. 14/727,271, filed Jun. 1, 2015, which is a continuation of U.S. patent application Ser. No. 14/472,998, filed Aug. 29, 2014, now U.S. Pat. No. 9,215,323, which is a continuation of U.S. patent application Ser. No. 12/266,446, filed Nov. 6, 2008, now U.S. Pat. No. 8,824,658, each of which is hereby incorporated by reference in their entirety as if fully set forth herein.

FIELD OF THE DISCLOSURE

This disclosure generally relates to contact centers and, more particularly, to techniques for benchmarking pairing strategies in a contact center system.

BACKGROUND OF THE DISCLOSURE

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email) or outbound contacts. At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy.

Some contact centers may use a "performance based routing" or "PBR" approach to ordering the queue of available agents or, occasionally, contacts. PBR ordering strategies attempt to maximize the expected outcome of each contact-agent interaction but do so typically without regard for utilizing agents in a contact center uniformly.

When a contact center changes from using one type of pairing strategy (e.g., FIFO) to another type of pairing strategy (e.g., PBR), overall contact center performance will continue to vary over time. It can be difficult to measure the amount of performance change attributable to using a new pairing strategy because there may be other factors that account for some of the increased or decreased performance over time.

In view of the foregoing, it may be understood that there is a need for a system that enables benchmarking of alternative routing strategies to measure changes in performance attributable to the alternative routing strategies.

SUMMARY OF THE DISCLOSURE

Techniques for benchmarking pairing strategies in a contact center system are disclosed. In one particular embodiment, the techniques may be realized as a method for benchmarking pairing strategies in a contact center system comprising: cycling, by at least one processor configured for contact center operations, among at least two pairing strategies; and determining, by the at least one processor, a difference in performance between the at least two pairing strategies, wherein at least one contact was paired in a sequence of contact interactions to reach a final outcome during a final contact interaction of the sequence of contact interactions.

In accordance with other aspects of this particular embodiment, a final outcome indicator for each of the sequence of contact interactions may indicate the final outcome determined from the final contact interaction of the sequence of contact interactions.

In accordance with other aspects of this particular embodiment, a pairing strategy indicator for each of the sequence of contact interactions may indicate which of the at least two pairing strategies was used for pairing each of the sequence of contact interactions.

In accordance with other aspects of this particular embodiment, an iteration indicator for each of the sequence of contact interactions may indicate a sequence iteration number in which each of the sequence of contact interactions occurred.

In accordance with other aspects of this particular embodiment, determining the difference in performance may further comprise: determining, by the at least one processor, an intermediate measure of performance for each set of contact interactions indicated by a same sequence iteration number; and determining, by the at least one processor, an overall difference in performance based on a combination of the intermediate measure of performance for each set of contact interactions for all sequence iteration numbers.

In accordance with other aspects of this particular embodiment, the combination is a weighted average of the intermediate measure of performance for each set of contact interactions.

In accordance with other aspects of this particular embodiment, the method may further comprise: determining, by the at least one processor, each arrival time of the at least one contact; and selecting, by the at least one processor, one of the at least two pairing strategies for each arrival time of the at least one contact based on each arrival time and irrespective of any prior pairings for the at least one contact.

In another particular embodiment, the techniques may be realized as a system for benchmarking pairing strategies in a contact center system comprising at least one processor configured for contact center operations, wherein the at least one processor is configured to perform the above-described method.

In another particular embodiment, the techniques may be realized as an article of manufacture for benchmarking pairing strategies in a contact center system comprising: a non-transitory processor readable medium; and instructions stored on the medium; wherein the instructions are configured to be readable from the medium by at least one processor configured for contact center operations and thereby cause the at least one processor to operate so as to perform the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1A:
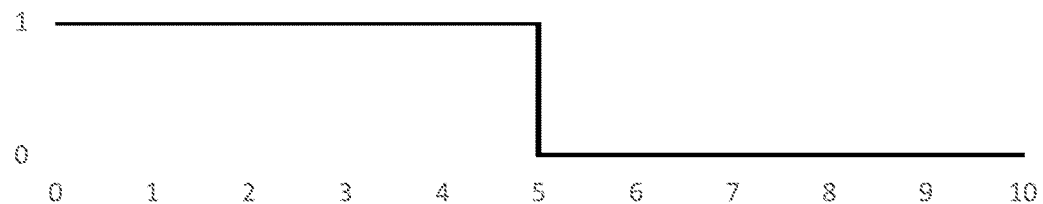
FIG. 1A shows a schematic representation of a benchmarking sequence according to embodiments of the present disclosure.

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email) or outbound contacts. At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. For example, a longest-available agent pairing strategy preferably selects the available agent who has been available for the longest time.

Some contact centers may use a "performance based routing" or "PBR" approach to ordering the queue of available agents or, occasionally, contacts. PBR ordering strategies attempt to maximize the expected outcome of each contact-agent interaction but do so typically without regard for utilizing agents in a contact center uniformly. Some variants of PBR may include a highest-performing-agent pairing strategy, preferably selecting the available agent with the highest performance, or a highest-performing-agent-for-contact-type pairing strategy, preferably selecting the available agent with the highest performance for the type of contact being paired.

For yet another example, some contact centers may use a "behavioral pairing" or "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and PBR strategies. BP is designed to encourage balanced utilization of agents within a skill queue while nevertheless simultaneously improving overall contact center performance beyond what FIFO or PBR methods will allow. This is a remarkable achievement inasmuch as BP acts on the same calls and same agents as FIFO or PBR methods, utilizes agents approximately evenly as FIFO provides, and yet improves overall contact center performance. BP is described in, e.g., U.S. patent application Ser. No. 14/871,658, filed Sep. 30, 2015, which is incorporated by reference herein. Additional information about these and other features regarding the pairing or matching modules (sometimes also referred to as "SATMAP", "routing system", "routing engine", etc.) is described in, for example, U.S. Pat. No. 8,879,715, which is incorporated herein by reference.

Some contact centers may use a variety of other possible pairing strategies. For example, in a longest-available agent pairing strategy, an agent may be selected who has been waiting (idle) the longest time since the agent's most recent contact interaction (e.g., call) has ended. In a least-occupied agent pairing strategy, an agent may be selected who has the lowest ratio of contact interaction time to waiting or idle time (e.g., time spent on calls versus time spent off calls). In a fewest-contact-interactions-taken-by-agent pairing strategy, an agent may be selected who has the fewest total contact interactions or calls. In a randomly-selected-agent pairing strategy, an available agent may be selected at random (e.g., using a pseudorandom number generator). In a sequentially-labeled-agent pairing strategy, agents may be labeled sequentially, and the available agent with the next label in sequence may be selected.

In situations where multiple contacts are waiting in a queue, and an agent becomes available for connection to one of the contacts in the queue, a variety of pairing strategies may be used. For example, in a FIFO or longest-waiting-contact pairing strategy, the agent may be preferably paired with the contact that has been waiting in queue the longest (e.g., the contact at the head of the queue). In a randomly-selected-contact pairing strategy, the agent may be paired with a contact selected at random from among all or a subset of the contacts in the queue. In a priority-based routing or highest-priority-contact pairing strategy, the agent may be paired with a higher-priority contact even if a lower-priority contact has been waiting in the queue longer.

Contact centers may measure performance based on a variety of metrics. For example, a contact center may measure performance based on one or more of sales revenue, sales conversion rates, customer retention rates, average handle time, customer satisfaction (based on, e.g., customer surveys), etc. Regardless of what metric or combination of metrics a contact center uses to measure performance, or what pairing strategy (e.g., FIFO, PBR, BP) a contact center uses, performance may vary over time. For example, year-over-year contact center performance may vary as a company shrinks or grows over time or introduces new products or contact center campaigns. Month-to-month contact center performance may vary as a company goes through sales cycles, such as a busy holiday season selling period, or a heavy period of technical support requests following a new product or upgrade rollout. Day-to-day contact center performance may vary if, for example, customers are more likely to call during a weekend than on a weekday, or more likely to call on a Monday than a Friday. Intraday contact center performance may also vary. For example, customers may be more likely to call at when a contact center first opens (e.g., 8:00 AM), or during a lunch break (e.g., 12:00 PM), or in the evening after typical business hours (e.g., 6:00 PM), than at other times during the day. Intra-hour contact center performance may also vary. For example, more urgent, high-value contacts may be more likely to arrive the minute the contact center opens (e.g., 9:00 or 9:01) than even a little later (e.g., 9:05). Contact center performance may also vary depending on the number and caliber of agents working at a given time. For example, the 9:00-5:00 PM shift of agents may perform, on average, better than the 5:00-9:00 AM shift of agents.

These examples of variability at certain times of day or over larger time periods can make it difficult to attribute changes in performance over a given time period to a particular pairing strategy. For example, if a contact center used FIFO routing for one year with an average performance of 20% sales conversion rate, then switched to PBR in the second year with an average performance of 30% sales conversion rate, the apparent change in performance is a 50% improvement. However, this contact center may not have a reliable way to know what the average performance in the second year would have been had it kept the contact center using FIFO routing instead of PBR. In real-world situations, at least some of the 50% gain in performance in the second year may be attributable to other factors or variables that were not controlled or measured. For example, the contact center may have retrained its agents or hired higher-performing agents, or the company may have introduced an improved product with better reception in the marketplace. Consequently, contact centers may struggle to analyze the internal rate of return or return on investment from switching to a different to a different pairing strategy due to challenges associated with measuring performance gain attributable to the new pairing strategy.

In some embodiments, a contact center may switch (or "cycle") periodically among at least two different pairing strategies (e.g., between FIFO and PBR; between PBR and BP; among FIFO, PBR, and BP). Additionally, the outcome of each contact-agent interaction may be recorded along with an identification of which pairing strategy (e.g., FIFO, PBR, or BP) had been used to assign that particular contact-agent pair. By tracking which interactions produced which results, the contact center may measure the performance attributable to a first strategy (e.g., FIFO) and the performance attributable to a second strategy (e.g., PBR). In this way, the relative performance of one strategy may be benchmarked against the other. The contact center may, over many periods of switching between different pairing strategies, more reliably attribute performance gain to one strategy or the other.

Several benchmarking techniques may achieve precisely measurable performance gain by reducing noise from confounding variables and eliminating bias in favor of one pairing strategy or another. In some embodiments, benchmarking techniques may be time-based ("epoch benchmarking"). In other embodiments, benchmarking techniques may involve randomization or counting ("inline benchmarking"). In other embodiments, benchmarking techniques may be a hybrid of epoch and inline benchmarking.

In epoch benchmarking, as explained in detail below, the switching frequency (or period duration) can affect the accuracy and fairness (e.g., statistical purity) of the benchmark. For example, assume the period is two years, switching each year between two different strategies. In this case, the contact center may use FIFO in the first year at a 20% conversion rate and PBR in the second year at a 30% conversion rate, and measure the gain as 50%. However, this period is too large to eliminate or otherwise control for expected variability in performance. Even shorter periods such as two months, switching between strategies each month, may be susceptible to similar effects. For example, if FIFO is used in November, and PBR is used December, some performance improvement in December may be attributable to increased holiday sales in December rather than the PBR itself.

In some embodiments, to reduce or minimize the effects of performance variability over time, the period may be much shorter (e.g., less than a day, less than an hour, less than twenty minutes). FIG. 1A shows a benchmarking period of ten units (e.g., ten minutes). In FIG. 1A, the horizontal axis represents time, and the vertical axis represents whether a first pairing strategy ("1") or a second pairing strategy ("0") is used. For the first five minutes (e.g., 9:00-9:05 AM), the first pairing strategy (e.g., BP) may be used. After five minutes, the contact center may switch to the second pairing strategy (e.g., FIFO or PBR) for the remaining five minutes of the ten-minute period (9:05-9:10 AM). At 9:10 AM, the second period may begin, switching back to the first pairing strategy (not shown in FIG. 1A). If the period is 30 minutes (i.e., each unit of time in FIG. 1A is equal to three minutes), the first pairing strategy may be used for the first 15 minutes, and the second pairing strategy may be used for the second 15 minutes.

With short, intra-hour periods (10 minutes, 20 minutes, 30 minutes, etc.), the benchmark is less likely to be biased in favor of one pairing strategy or another based on long-term variability (e.g., year-over-year growth, month-to-month sales cycles). However, other factors of performance variability may persist. For example, if the contact center always applies the period shown in FIG. 1A when it opens in the morning, the contact center will always use the first strategy (BP) for the first five minutes. As explained above, the contacts who arrive at a contact center the moment it opens may be of a different type, urgency, value, or distribution of type/urgency/value than the contacts that arrive at other times of the hour or the day. Consequently, the benchmark may be biased in favor of the pairing strategy used at the beginning of the day (e.g., 9:00 AM) each day.

Figure 1B:
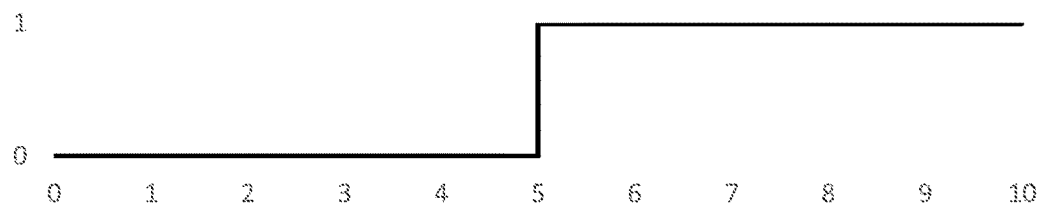
FIG. 1B shows a schematic representation of benchmarking sequence according to embodiments of the present disclosure.

In some embodiments, to reduce or minimize the effects of performance variability over even short periods of time, the order in which pairing strategies are used within each period may change. For example, as shown in FIG. 1B, the order in which pairing strategies are used has been reversed from the order shown in FIG. 1A. Specifically, the contact center may start with the second pairing strategy (e.g., FIFO or PBR) for the first five minutes, then switch to the first pairing strategy (BP) for the following five minutes.

In some embodiments, to help ensure trust and fairness in the benchmarking system, the benchmarking schedule may be established and published or otherwise shared with contact center management ahead or other users of time. In some embodiments, contact center management or other users may be given direct, real-time control over the benchmarking schedule, such as using a computer program interface to control the cycle duration and the ordering of pairing strategies.

Embodiments of the present disclosure may use any of a variety of techniques for varying the order in which the pairing strategies are used within each period. For example, the contact center may alternate each hour (or each day or each month) between starting with the first ordering shown in FIG. 1A and starting with the second ordering shown in FIG. 1B. In other embodiments, each period may randomly select an ordering (e.g., approximately 50% of the periods in a given day used the ordering shown in FIG. 1A, and approximately 50% of the periods in a given day use the ordering shown in FIG. 1B, with a uniform and random distribution of orderings among the periods).

Figure 2A:
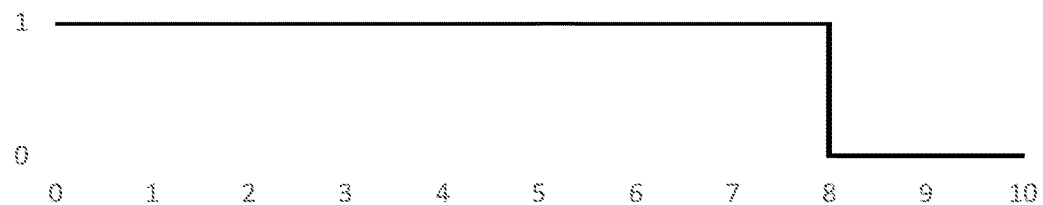
FIG. 2A shows a schematic representation of benchmarking sequence according to embodiments of the present disclosure.

In the examples of FIGS. 1A and 1B, each pairing strategy is used for the same amount of time within each period (e.g., five minutes each). In these examples, the "duty cycle" is 50%. However, notwithstanding other variables affecting performance, some pairing strategies are expected to perform better than others. For example, BP is expected to perform better than FIFO. Consequently, a contact center may wish to use BP for a greater proportion of time than FIFO—so that more pairings are made using the higher-performing pairing strategy. Thus, the contact center may prefer a higher duty cycle (e.g., 60%, 70%, 80%, 90%, etc.) representing more time (or proportion of contacts) paired using the higher-performing pairing strategy. FIG. 2A shows an example of a ten-minute period with an 80% duty cycle. For the first eight minutes (e.g., 9:00-9:08 AM), the first pairing strategy (e.g., BP) may be used. After the first eight minutes, the contact center may switch to the second pairing strategy (e.g., FIFO) for the remaining two minutes of the period (9:08-9:10) before switching back to the first pairing strategy again (not shown). If, for another example, a thirty-minute period is used, the first pairing strategy may be used for the first twenty-four minutes (e.g., 9:00-9:24 AM), and the second pairing strategy may be used for the next six minutes (e.g., 9:24-9:30 AM).

Figure 2B:
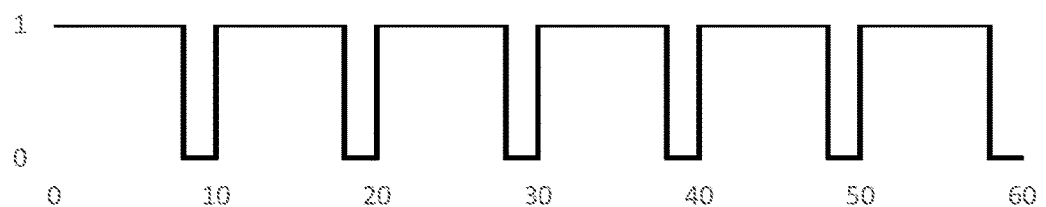
FIG. 2B shows a schematic representation of benchmarking sequence according to embodiments of the present disclosure.

As shown in FIG. 2B, the contact center may proceed through six ten-minute periods over the course of an hour. In this example, each ten-minute period has an 80% duty cycle favoring the first pairing strategy, and the ordering within each period starts with the favored first pairing strategy. Over the hour, the contact center may switch pairing strategies twelve times (e.g., at 9:08, 9:10, 9:18, 9:20, 9:28, 9:30, 9:38, 9:40, 9:48, 9:50, 9:58, and 10:00). Within the hour, the first pairing strategy was used a total of 80% of the time (48 minutes), and the second pairing strategy was used the other 20% of the time (12 minutes). For a thirty-minute period with an 80% duty cycle (not shown), over the hour, the contact center may switch pairing strategies four times (e.g., at 9:24, 9:30, 9:48, and 10:00), and the total remains 48 minutes using the first pairing strategy and 12 minute using the second pairing strategy.

In some embodiments, as in the example of FIG. 1B, the order in which the pairing strategies are used within a period may change (not shown), even as the duty cycle (percentage of time within the period that a given strategy is used) remains the same. Nevertheless, for periods which are factors or multiples of 60 minutes (e.g., 10 minutes, 30 minutes), periods may always or frequently align to boundaries at the top of each hour (e.g., new periods begin at 9:00, 10:00, 11:00, etc.), regardless of the ordering of pairing strategies to be used for the period at the beginning of a given hour.

In some embodiments, as explained below with references to FIGS. 3A-D, choosing a period such as 11 minutes, 37 minutes, some prime or other numbers that do not factor into 60-minute intervals, can increase the number of periods required before a particular pattern repeats. Instead, the alignment of periods may drift through hours, days, weeks, etc. before repeating. The duration of a cycle through each pairing strategy may align infrequently with to the hours of a day, days of a week, weeks of a month or year, etc.

Figure 3A:
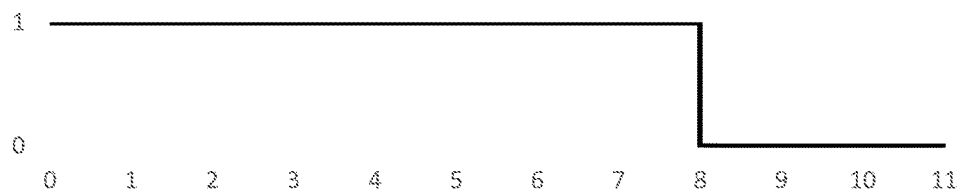
FIG. 3A shows a schematic representation of benchmarking sequence according to embodiments of the present disclosure.
Figure 3B:
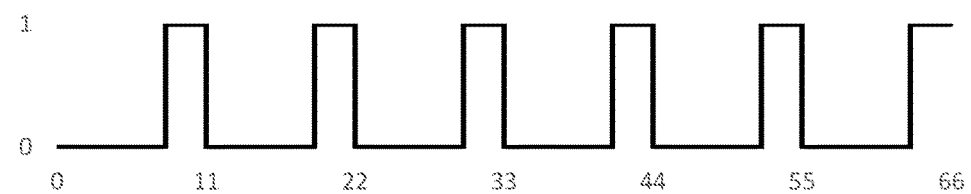
FIG. 3B shows a schematic representation of benchmarking sequence according to embodiments of the present disclosure.
Figure 3C:
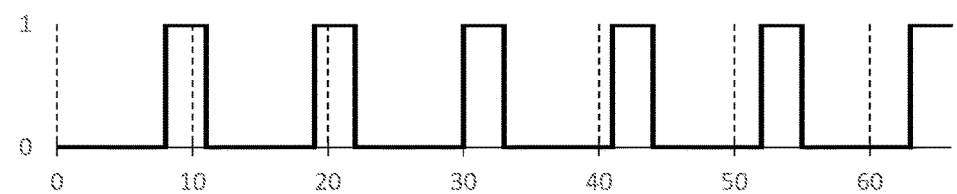
FIG. 3C shows a block diagram of a contact center system according to embodiments of the present disclosure.

FIG. 3A shows an example of a single non-factor period of 11 minutes and approximately a 73% duty cycle, with the first eight minutes using a first pairing strategy and the last three minutes using a second pairing strategy. FIG. 3B illustrates six consecutive cycles. For example, at the top of the first hour on the first day of the week (e.g., Monday at 9:00 AM), the first period may begin, aligned on the top of the hour, the first hour of the day, and the first day of the week. The first period may last from 9:00-9:11 AM, followed by the second period from 9:11-9:22 AM, and so on, as illustrated in FIG. 3B and Table I below. The sixth period begins at 9:55 and ends at 10:06. The top of the second hour (10:00 AM), occurs during the sixth cycle and is not aligned with the beginning of a period. FIG. 3C shows the same six periods as FIG. 3B, with the horizontal axis marking time on ten-minute intervals to illustrate the intentional intra-hour misalignment further.

TABLE I

| Period # | Time Period Begins |
|---|---|
| 1 | 9:00 |
| 2 | 9:11 |
| 3 | 9:22 |
| 4 | 9:33 |
| 5 | 9:44 |
| 6 | 9:55 |
| 7 | 10:06 |

Figure 3D:
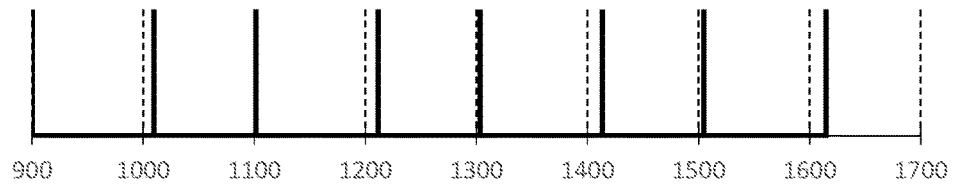
FIG. 3D shows a block diagram of a behavioral pairing module according to embodiments of the present disclosure.

As shown in FIG. 3D and Table II below, the alignment of periods with respect to the nearest hour continues to drift throughout a day, using an example of a contact center open from 9:00 AM to 5:00 PM (9:00-17:00 hours). The first period of the first hour (9:00 AM) is aligned with the top of the hour (9:00 AM). The first period of the second hour (10:00 AM) begins at 10:06 AM, six minutes after the top of the hour. The first period of the third hour (11:00 AM) begins at 11:01 AM, one minute after the top of the hour. It would take 60 periods over 11 hours for the first period of an hour to once again align with the top of the hour. As shown in Table II, a contact center that is open from 9-5 would not be aligned on the hour again until 12:00 PM the following day (1.375 eight-hour days later).

TABLE II

| Hour | Time of First Period of Hour |
|---|---|
| 1 | 9:00 |
| 2 | 10:06 |
| 3 | 11:01 |
| 4 | 12:07 |
| 5 | 13:02 |
| 6 | 14:08 |

TABLE II-continued

| Hour | Time of First Period of Hour |
|---|---|
| 7 | 15:03 |
| 8 (next day) | 16:09 |
| 9 | 9:04 |
| 10 | 10:10 |
| 11 | 11:05 |
| 12 | 12:00 |

Table III below shows the sequence of days and times at which a new period begins at the top of the hour. For example, assuming five-day weeks Monday-Friday with eight-hour days from 9-5, the sequence would proceed from aligning on Monday at 9:00 AM, to Tuesday at 12:00 PM, to Wednesday at 3:00 PM (15:00), to Friday at 10:00 AM, and so on. As shown in Table III, it would take 2.2 weeks for a contact center that is open five days per week for eight hours per day to be aligned at the beginning of a day (e.g., Tuesday at 9:00 AM over two weeks later).

TABLE III

| Day | Next Time Period Starts at Top of Hour |
|---|---|
| Monday | 9:00 |
| Tuesday | 12:00 |
| Wednesday | 15:00 |
| Friday (next week) | 10:00 |
| Monday | 13:00 |
| Tuesday | 16:00 |
| Thursday | 11:00 |
| Friday (next week) | 14:00 |
| Tuesday | 9:00 |

Table IV below shows the sequence of days of the week on which a new period begins at the top of that day of the week. In this example, assuming five-day weeks Monday-Friday with eight-hour days, the sequence would proceed from aligning with the beginning of the day on Monday in week 1, Tuesday in week 3, Wednesday in week 5, and so on. As shown in Table IV, it would take 11 weeks for this contact center to be aligned at the beginning of a Monday again.

TABLE IV

| Week | Next Day Cycle Starts at Top of Day |
|---|---|
| 1 | Monday |
| 3 | Tuesday |
| 5 | Wednesday |
| 7 | Thursday |
| 9 | Friday |
| 12 | Monday |

Thus, as FIGS. 3A-3D and Tables I-IV have illustrated, selecting a non-factor period for an hour/day/week/etc. boundary may be effective for enabling the alignment of periods to "drift" through natural time boundaries over weeks/months/years. Because the alignment of periods drifts, it is less likely for a pattern to arise that confounds measuring relative performance of multiple pairing strategies. In some embodiments, selection of a non-factor period may be combined with other techniques for reducing the effect of confounding variables on performance, such as randomizing or otherwise changing the ordering of pairing strategies within each period or a set of periods.

In some embodiments, the contact center may determine which pairing strategy to use based on the time at which a pairing request is made for a contact. For example, assume a contact center is benchmarking BP and FIFO using the example of FIG. 1A (ten-minute periods with a 50% duty cycle, starting with BP in the first half and FIFO in the second half). If the contact center requests a pairing at 9:04 AM, the time of the pairing falls in the first half of a period, so the BP strategy may be used. If the contact center requests a pairing at 9:06 AM, the time of the pairing falls in the second half of the period, so the FIFO strategy may be used.

In other embodiments, the contact center may determine which pairing strategy to use based on the time at which a contact arrives. For example, assume a contact center is benchmarking BP and FIFO as in the preceding example. If the first contact arrives at 9:04 AM, the time of arrival falls in the first half of a period, so the BP strategy may be used for the contact. Even if the first contact must wait in a queue for two minutes, and the pairing is not requested until 9:06 AM, the pairing may still be made using the BP strategy. Moreover, if a second contact arrives at 9:05 AM, while the first contact is still waiting in queue, the second contact may be designated for FIFO pairing. Consequently, at 9:06 AM, contact choice under behavioral pairing may be limited to only the contacts in queue who arrived during the BP portion of the period and, in this example, only the first contact to arrive would be available.

In embodiments for epoch-based benchmarking in which a contact arrives on a boundary between periods, or on a boundary between switching pairing strategies within a period, the system may have predetermined tie-breaking strategies. For example, the boundary may be defined as "at or before" an aforementioned time, or "on or after" an aforementioned time, etc. For example, if a period is defined to be associated with strategy "A" from 9:00-9:08 and strategy B from 9:08-9:10, it may mean that a contact must arrive on or after 9:00 but before 9:08 (e.g., 9:07.99) to be considered within the first part of the period. Alternatively, it may mean that a contact must arrive after 9:00 but at or before 9:08.00 to be considered within the first part of the period.

In some embodiments, inline benchmarking techniques may be used, in which pairing strategies may be selected on a contact-by-contact basis. For example, assume that approximately 50% of contacts arriving at a contact center should be paired using a first pairing method (e.g., FIFO), and the other 50% of contacts should be paired using a second pairing method (e.g., BP).

In some embodiments, each contact may be randomly designated for pairing using one method or the other with a 50% probability. In other embodiments, contacts may be sequentially designated according to a particular period. For example, the first five (or ten, or twenty, etc.) contacts may be designated for a FIFO strategy, and the next five (or ten, or twenty, etc.) may be designated for a BP strategy. Other percentages and proportions may also be used, such as 60% (or 80%, etc.) paired with a BP strategy and the other 40% (or 20%, etc.) paired with a FIFO strategy.

From time to time, a contact may return to a contact center (e.g., call back) multiple times. In particular, some contacts may require multiple "touches" (e.g., multiple interactions with one or more contact center agents) to resolve an issue. In these cases, it may be desirable to ensure that a contact is paired using the same pairing strategy each time the contact returns to the contact center. If the same pairing strategy is used for each touch, then the benchmarking technique will ensure that this single pairing strategy is associated with the final outcome (e.g., resolution) of the multiple contact-agent interactions. In other situations, it may be desirable to switch pairing strategies each time a contact returns to the contact center, so that each pairing strategy may have an equal chance to be used during the pairing that resolves the contact's needs and produces the final outcome. In yet other situations, it may be desirable to select pairing strategies without regard to whether a contact has contacted the contact center about the same issue multiple times.

In some embodiments, the determination of whether a repeat contact should be designated for the same (or different) pairing strategy may depend on other factors. For example, there may be a time limit, such that the contact must return to the contact center within a specified time period for prior pairing strategies to be considered (e.g., within an hour, within a day, within a week). In other embodiments, the pairing strategy used in the first interaction may be considered regardless of how much time has passed since the first interaction.

For another example, repeat contact may be limited to specific skill queues or customer needs. Consider a contact who called a contact center and requested to speak to a customer service agent regarding the contact's bill. The contact hangs up and then calls back a few minutes later and requests to speak to a technical support agent regarding the contact's technical difficulties. In this case, the second call may be considered a new issue rather than a second "touch" regarding the billing issue. In this second call, it may be determined that the pairing strategy used in the first call is irrelevant to the second call. In other embodiments, the pairing strategy used in the first call may be considered regardless of why the contact has returned to the contact center.

Figure 4:
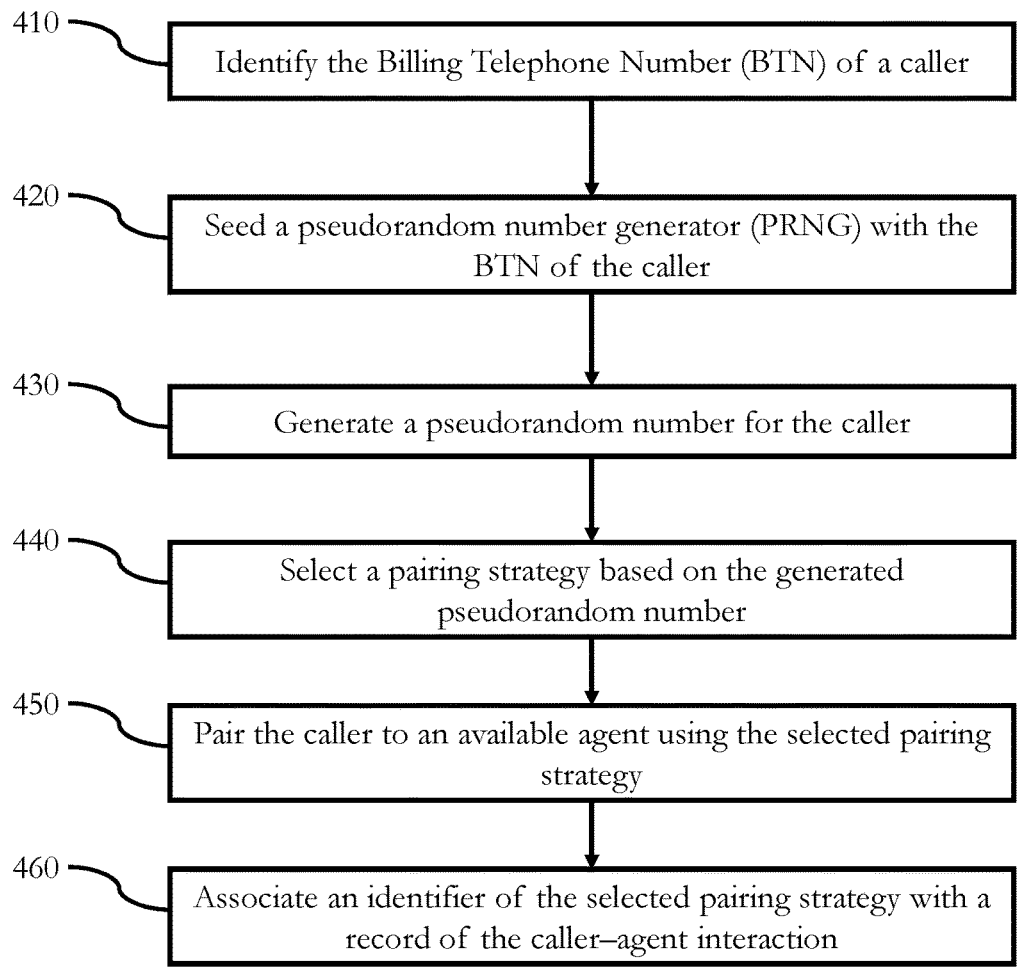
FIG. 4 shows a block diagram of a contact center according to embodiments of the present disclosure.

One approach to considering prior pairing for inline benchmarking techniques is depicted in FIG. 4. FIG. 4 shows a flow diagram of benchmarking method 400 according to embodiments of the present disclosure. Benchmarking method 400 may begin at block 410.

At block 410, an identifier of a contact (e.g., caller) may be identified or otherwise determined. In this example, a caller's "Billing Telephone Number" or "BTN" may be identified. This example assumes that a caller uses the same BTN for each call. In other embodiments, other identifiers of the contact (e.g., a customer identification number, Internet Protocol (IP) address) may be used instead. Having identified the caller's BTN (or other contact identifier), benchmarking method 400 may proceed to block 420.

At block 420, a pseudorandom number generator (PRNG) may be seeded with the BTN (or other contact identifier). Having seeded the PRNG with the BTN, benchmarking method 400 may proceed to block 430.

At block 430, a pseudorandom number may be generated for the contact using the seeded PRNG. Because the seed will be the same for a given contact each time the contact returns to the contact center, the generated pseudorandom number will also be the same each time for the given contact. Having generated the pseudorandom number, benchmarking method 400 may proceed to block 440.

At block 440, a pairing strategy (e.g., BP or FIFO) may be selected for the given contact based on the generated pseudorandom number. For example, if 50% of contacts should be paired using BP, and the other 50% should be paired using FIFO, the PRNG may be configured to generate either a 1 or a 0. If the generated pseudorandom number is a 1, the contact may be designated for BP pairing. If the generated pseudorandom number is 0, the contact may be designated for FIFO pairing.

In this way, the contact will always be paired using the same strategy each time the contact returns to the contact center. The PRNG will be seeded with the same seed (e.g., the contact's BTN) each time, so the PRNG will generate the same pseudorandom number for the contact each time. Thus, benchmarking method 400 may select the same pairing strategy for the contact each time. In this way, it is possible to account for prior pairings without relying on a database or other storage means to determine whether or how a contact has been previously paired. In this way, benchmarking method 400 is stateless with respect to whether or how a contact has been previously paired. Having selected a pairing strategy for the contact, benchmarking method 400 may proceed to block 450.

At block 450, the contact may be paired to an available agent using the selected pairing strategy. When a contact has been paired with an available agent, components of the contact center system (e.g., switches, routers) may connect the contact to the agent. Following (or during) the contact-agent interaction, the agent may create a record of the outcome of the interaction. For example, in a sales queue, the agent may create an order for the contact. In a technical support queue, the agent may create or modify a service ticket. The contact center system may also record information about the interaction, such as the time and duration of a call, the BTN or other identifier of the contact, the agent identifier, and other data. At this point, benchmarking method may proceed to block 460.

At block 460, an identifier of the selected pairing strategy may be associated with the record of the contact-agent interaction created at block 450. In some embodiments, this may happen simultaneously with the creation of the record. For example, when the contact center system records the time and duration of a call, it may also record whether the call had been paired using a BP or FIFO pairing strategy. In other embodiments, another module may create a separate record of the pairing. This module may record the time of the pairing, the contact and agent identifiers, the pairing strategy used (e.g., BP or FIFO), and any other data that may be helpful for later matching the pairing record with the record of the caller-agent interaction outcome. At some later time, the pairing records may be matched with the caller-agent interaction records so that the pairing strategy information may be associated with the outcome in one record or the other (or both). Following block 460, benchmarking method 400 may end. In some embodiments, benchmarking method 400 may return to block 410, waiting for another contact to arrive.

Figure 5:
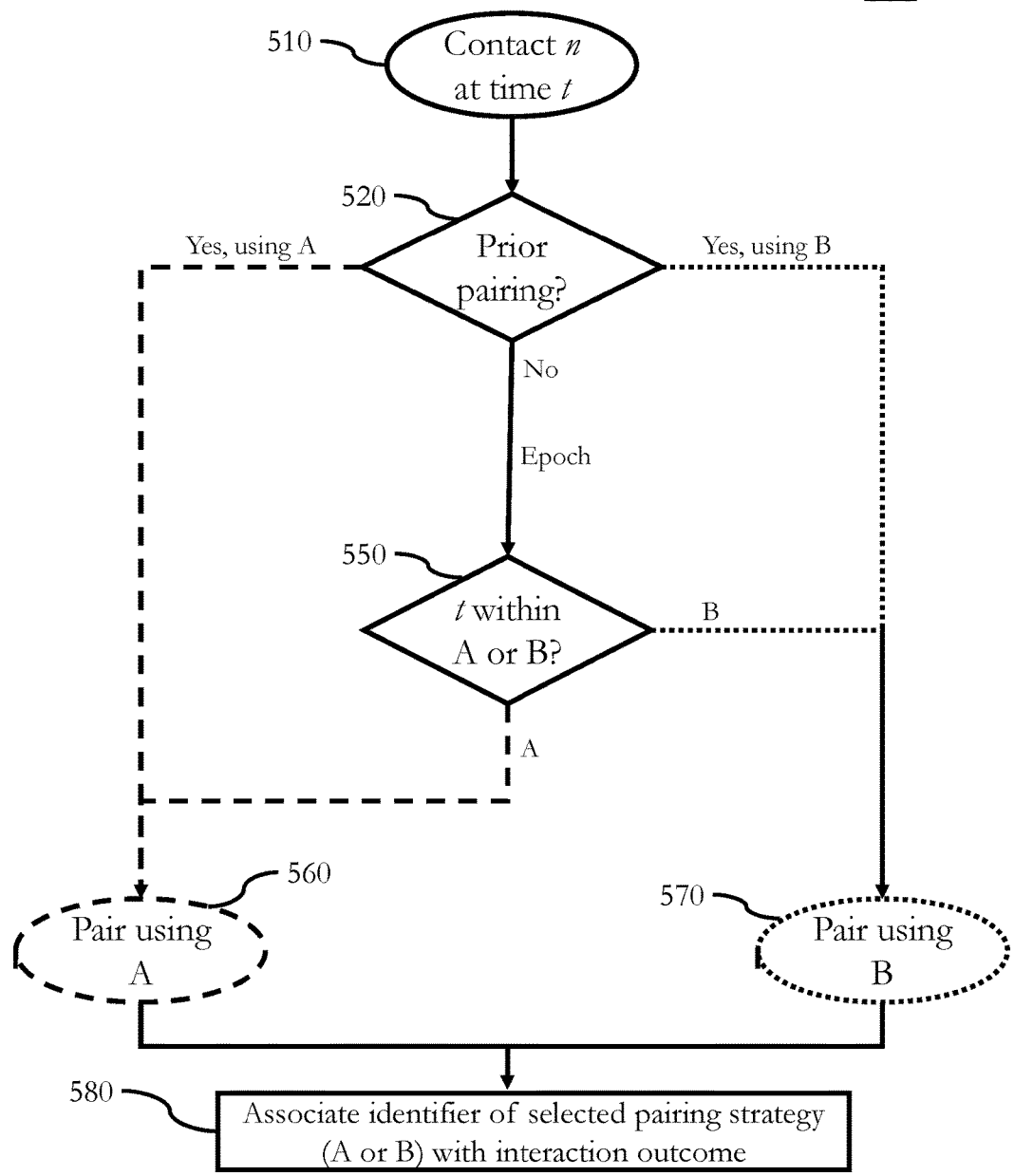
FIG. 5 shows a flow diagram of a benchmarking method according to embodiments of the present disclosure.

Another approach to considering prior pairing in combination with epoch benchmarking techniques is depicted in FIG. 5. This type of technique may be considered "hybrid inline-epoch benchmarking." FIG. 5 shows a flow diagram of benchmarking method 500 according to embodiments of the present disclosure. Benchmarking method 500 may begin at block 510.

At block 510, a contact (e.g., "contact n") arrives at the contact center at a particular time t. Benchmarking method 500 may proceed to block 520.

At block 520, it may be determined whether the contact has been previously paired; i.e., whether this contact is returning to the contact center for a subsequent touch or interaction. This decision may be made using a variety of techniques. For example, the benchmarking system may look up the contact's records using a contact identifier (e.g., BTN or customer ID) in a database to determine whether and when the contact had previously contacted the contact center. Using a suitable technique, the benchmarking system may determine that the contact had been previously paired and, in some embodiments, whether and how the prior pairing should influence the current pairing.

In some embodiments, the benchmarking system may preferably pair a contact using the same pairing strategy every time the contact returns to the contact center. Thus, if contact n was previously paired using pairing strategy "A" (e.g., BP), benchmarking method 500 may proceed to block 560 for subsequent pairing using pairing strategy A again. Similarly, if contact n was previously paired using pairing strategy "B") (e.g., FIFO), benchmarking method 500 may proceed to block 570 for subsequent pairing using pairing strategy B again.

However, if it is determined at block 520 that contact n has not been previously paired (or, in some embodiments, any prior pairing should not influence the current pairing), benchmarking method 500 may proceed to using epoch benchmarking at block 550.

At block 550, time may be used to determine which pairing strategy to use for contact n. In this example, arrival time t may be used. If contact n arrived during a time period when the benchmarking system is pairing using strategy A, benchmarking method 500 may proceed to block 560 for subsequent pairing using strategy A. Similarly, if contact n arrived during a time period when the benchmarking system is pairing using strategy B, benchmarking method 500 may proceed to block 570 for subsequent pairing using strategy B.

At blocks 560 and 570, contacts may be paired to available agents using pairing strategies A or B, respectively. In some embodiments, more than two pairing strategies may be used (e.g., prior pairings using A, B, C, etc. or epoch benchmarking within time periods using A, B, C, etc.). Once paired, the contact may be routed or otherwise connected to the available agent within the contact center system. As described above with respect to benchmarking method 400 (FIG. 4), the agent may create a record of the contact-agent interaction, and the contact center system may also create or modify this record. Benchmarking method may proceed to block 580.

At block 580, an identifier to the selected pairing strategy (e.g., A or B) may be associated with the record created at block 560 or 570. As described above with respect to benchmarking method 400, this association may occur simultaneously with the creation of the contact-agent interaction record, or it may be matched at a later time with other records created by a benchmarking module or other module. Following block 580, benchmarking method 500 may end. In some embodiments, benchmarking method 500 may return to block 510, waiting for another contact to arrive.

By associating the pairing strategy with the outcome as in, for example, benchmarking methods 400 and 500, the outcomes associated with each pairing strategy may be measured (e.g., averaged, accumulated), and the relative performance of each pairing strategy may be measured (e.g., the relative overall performance gain attributable to pairing using BP instead of pairing using FIFO). This benchmarking data may be used for a variety of purposes. For example, the data may be used to assess the strength of one pairing module over another. For another example, the data may be used to improve the strength of a BP module by providing "BP on" and "BP off" (e.g., FIFO) contact-agent interaction records to enhance the artificial intelligence in the system. For another example, the data may be used for billing.

Because the value added by one pairing strategy over another may be measured accurately and fairly, this benchmarking data may be used in a pay-for-performance business model, in which a client pays a pairing strategy vendor a percentage of the actual measured value added by using the vendor's pairing strategy (e.g., when BP is on as opposed to when BP is off).

Specifically, in some embodiments, associated outcome data may be used to determine an economic value or gain associated with using one pairing strategy instead of another. In some embodiments, the economic value or gain may be used to determine compensation for a vendor or other service provider providing a module or modules for the higher-performing pairing strategy creating the economic value. For example, if a contact center benchmarks BP against FIFO and determines that, for a given time period (e.g., a day, a week, a month, etc.), that BP performed 5% better than FIFO on average over the time period, the BP vendor may receive compensation corresponding to the 5% value added by BP (e.g., a percentage of the 5% additional sales revenue, or a percentage of the 5% additional cost savings, etc.). Under such a business model, a contact center owner may forgo capital expenditure or vendor fees, only paying a vendor for periods of time in which the vendor demonstrates value added to the contact center's performance.

Figure 6:
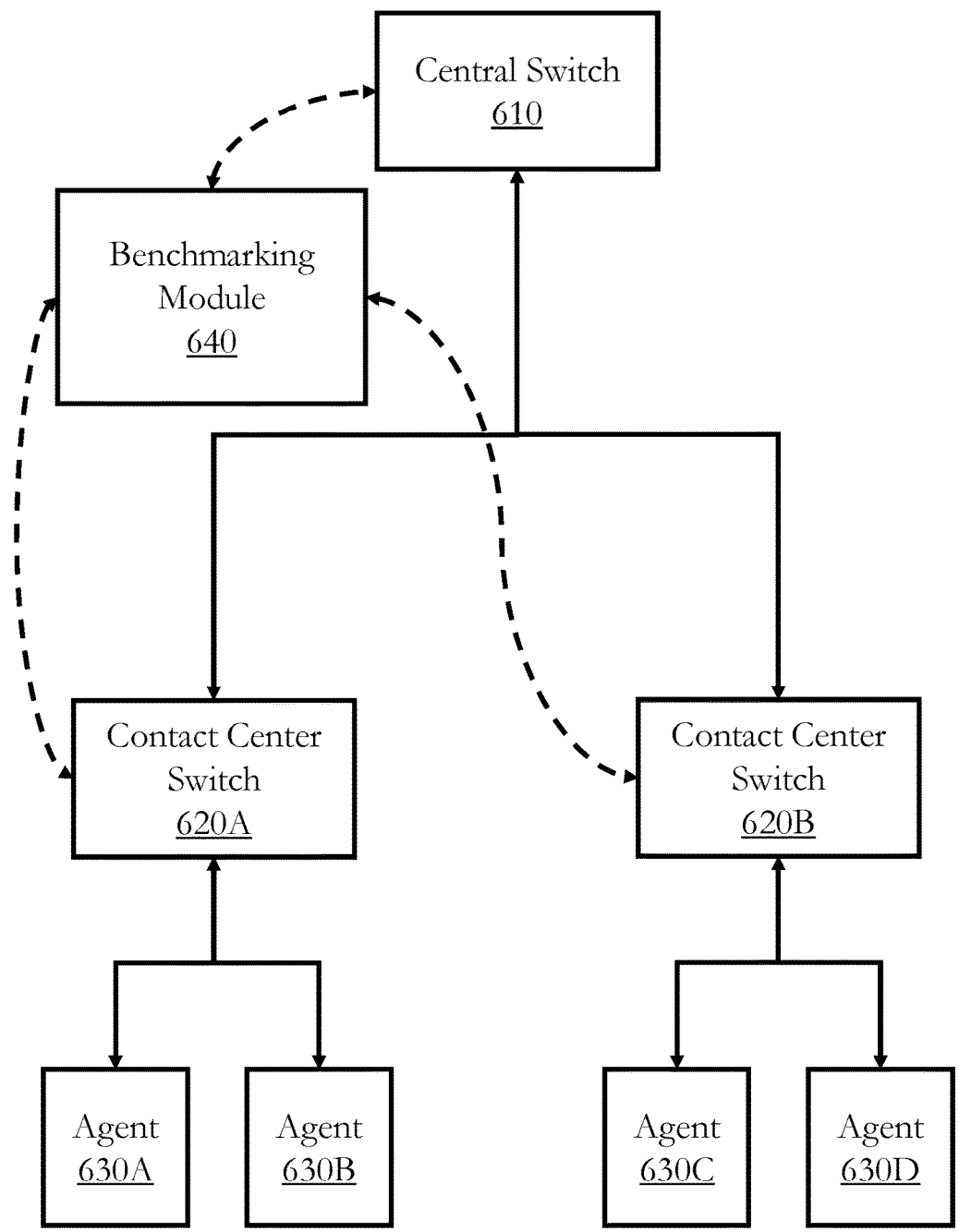
FIG. 6 depicts a block diagram of a benchmarking module according to embodiments of the present disclosure.

FIG. 6 shows a block diagram of a contact center system 600 according to embodiments of the present disclosure. The description herein describes network elements, computers, and/or components of a system and method for simulating contact center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 6, the contact center system 600 may include a central switch 610. The central switch 610 may receive incoming contacts (e.g., callers) or support outbound connections to contacts via a telecommunications network (not shown). The central switch 610 may include contact routing hardware and software for helping to route contacts among one or more contact centers, or to one or more PBX/ACDs or other queuing or switching components within a contact center.

The central switch 610 may not be necessary if there is only one contact center, or if there is only one PBX/ACD routing component, in the contact center system 600. If more than one contact center is part of the contact center system 600, each contact center may include at least one contact center switch (e.g., contact center switches 620A and 620B). The contact center switches 620A and 620B may be communicatively coupled to the central switch 610.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 6, the central switch 610 routes contacts to one of two contact centers via contact center switch 620A and contact center switch 620B, respectively. Each of the contact center switches 620A and 620B are shown with two agents each. Agents 630A and 630B may be logged into contact center switch 620A, and agents 630C and 630D may be logged into contact center switch 620B.

The contact center system 600 may also be communicatively coupled to an integrated service from, for example, a third party vendor. In the example of FIG. 6, benchmarking module 640 may be communicatively coupled to one or more switches in the switch system of the contact center system 600, such as central switch 610, contact center switch 620A, or contact center switch 620B. In some embodiments, switches of the contact center system 600 may be communicatively coupled to multiple benchmarking modules. In some embodiments, benchmarking module 640 may be embedded within a component of a contact center system (e.g., embedded in or otherwise integrated with a switch). The benchmarking module 640 may receive information from a switch (e.g., contact center switch 620A) about agents logged into the switch (e.g., agents 630A and 630B) and about incoming contacts via another switch (e.g., central switch 610) or, in some embodiments, from a network (e.g., the Internet or a telecommunications network) (not shown).

A contact center may include multiple pairing modules (e.g., a BP module and a FIFO module) (not shown), and one or more pairing modules may be provided by one or more different vendors. In some embodiments, one or more pairing modules may be components of benchmarking module 640 or one or more switches such as central switch 610 or contact center switches 620A and 620B. In some embodiments, a benchmarking module may determine which pairing module may handle pairing for a particular contact. For example, the benchmarking module may alternate between enabling pairing via the BP module and enabling pairing with the FIFO module. In other embodiments, one pairing module (e.g., the BP module) may be configured to emulate other pairing strategies. For example, a benchmarking module, or a benchmarking component integrated with BP components in the BP module, may determine whether the BP module may use BP pairing or emulated FIFO pairing for a particular contact. In this case, "BP on" may refer to times when the BP module is applying the BP pairing strategy, and "BP off" may refer to other times when the BP module is applying a different pairing strategy (e.g., FIFO).

In some embodiments, regardless of whether pairing strategies are handled by separate modules, or if some pairing strategies are emulated within a single pairing module, the single pairing module may be configured to monitor and store information about pairings made under any or all pairing strategies. For example, a BP module may observe and record data about FIFO pairings made by a FIFO module, or the BP module may observe and record data about emulated FIFO pairings made by a BP module operating in FIFO emulation mode.

Figure 7A:
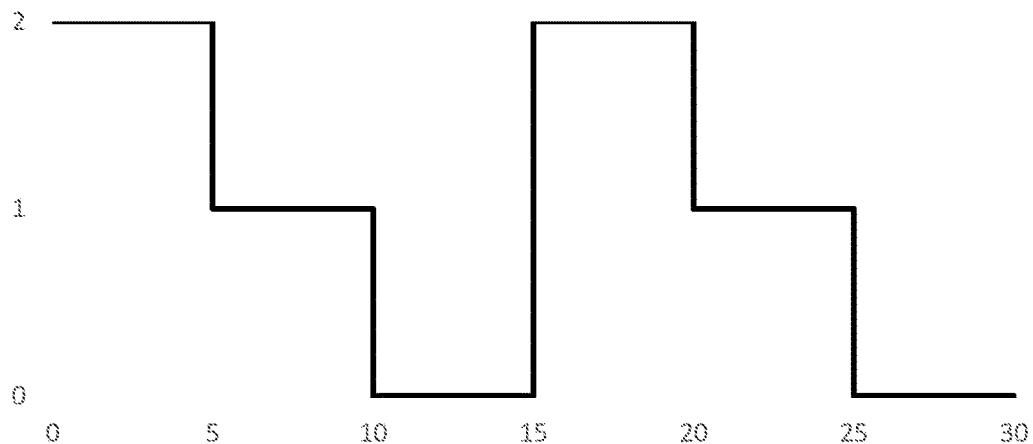
FIG. 7A shows a schematic representation of benchmarking sequence according to embodiments of the present disclosure.
Figure 7B:
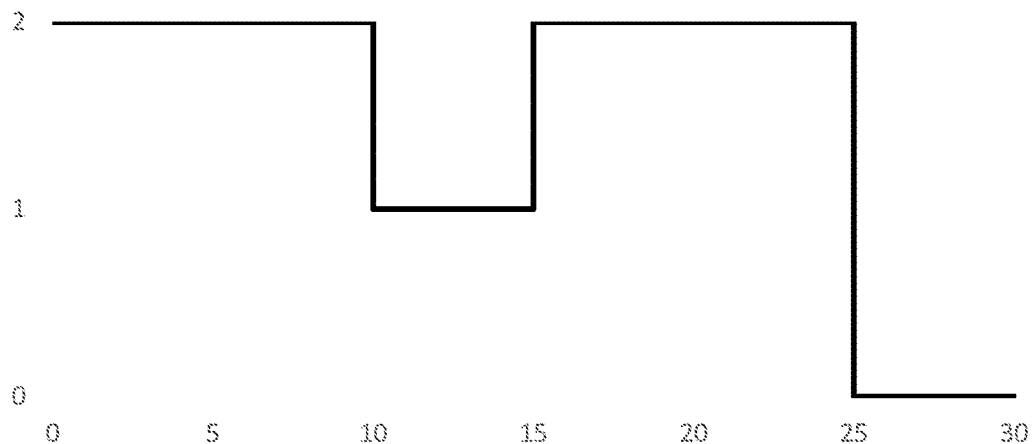
FIG. 7B shows a schematic representation of benchmarking sequence according to embodiments of the present disclosure.

Embodiments of the present disclosure are not limited to benchmarking only two pairing strategies. Instead, benchmarking may be performed for two or more pairing strategies. FIGS. 7A and 7B depict examples of benchmarking systems for three pairing strategies (e.g., benchmarking FIFO, PBR, and BP).

FIG. 7A shows a schematic representation of benchmarking sequence according to embodiments of the present disclosure. In this epoch benchmarking example, a period is 15 units of time, and each pairing strategy is used for one-third of the time (5 units). FIG. 7A shows two complete periods, cycling among pairing strategies "2", "1", and "0" twice over 30 units of time. For example, from 9:00-9:10 AM, FIFO may be used; from 9:10-9:20 AM, PBR may be used; and from 9:20-9:30 AM, BP may be used. This pattern of FIFO-PBR-BP repeats in the second period.

FIG. 7B shows a schematic representation of benchmarking sequence according to embodiments of the present disclosure. In this epoch benchmarking example, a complete period is 30 time units. A preferred pairing strategy "2" (e.g., BP) is used two-thirds of the time, and other pairing strategies "1" and "0" (e.g., FIFO and PBR) are used one-sixth of the time each. In this example, each time strategy "2" turns off, pairing strategies "1" and "0" alternately turn on. For example, the pattern may be BP-FIFO-BP-PBR. In addition to the examples of FIGS. 7A and 7B, many other patterns for switching among multiple pairing strategies are possible.

In some embodiments, contact center management or other users may prefer a "stabilization period" or other neutral zone. For example, consider a contact center benchmarking BP and FIFO pairing strategies. When the system transitions from BP to FIFO (or vice versa), contact center management may be concerned that the effects of one pairing strategy may somehow influence the performance of another pairing strategy. To alleviate these concerns about fairness, a stabilization period may be added.

One technique for implementing a stabilization period may be to exclude contact-agent interaction outcomes for the first portion of contacts after switching pairing strategies. For example, assume a contact center is benchmarking BP and FIFO with a 50% duty cycle over 30-minute periods. In the aforementioned embodiments (e.g., FIGS. 1A and 1B), BP would be on for 15 minutes, followed by FIFO for 15 minutes, and all of the contact-agent interactions in the 30-minute period would be included in the benchmarking measurement. With a stabilization period, BP would be on for, e.g., 10 minutes. After 10 minutes, the system would switch to FIFO. However, the first, e.g., 10 minutes would be considered a stabilization period, and FIFO pairings made during this period would be excluded from the benchmark. The last 10 minutes of the period would continue pairing using FIFO, and these FIFO pairings would be included in the benchmark.

This pattern is illustrated in FIG. 7A. In this example, instead of depicting switching among three pairing strategies "2", "1", and "0", the "1" may represent the stabilization period. Pairing strategy "2" (e.g., BP) may be on for the first five time units. After five time units, BP may be switched off, and the other pairing strategy (e.g., FIFO) may be used for the remaining ten time units. The next five units ("1") may be excluded as being part of the stabilization period, and the five time units after that ("0") may be included as being part of the FIFO benchmarking period.

In some embodiments, the stabilization period may be longer or shorter. In some embodiments, a stabilization period may be used in a FIFO-to-BP transition instead of, or in addition to, a BP-to-FIFO transition (or any transition between two different pairing strategies).

As noted above, some contacts may require multiple "touches" (e.g., multiple interactions with one or more contact center agents) to resolve the contact's needs. For example, an individual may call or otherwise contact a mortgage bank several times. The first call may be merely introductory or informational in nature, the second call may be to evaluate different loan offers, and the third call may be to close (accept) or decline a loan offer. Similarly, some technical support and customer service requests may require more than one contact interaction to resolve.

In some situations, it may be desirable to select pairing strategies without regard to whether a contact has contacted the contact center about the same issue multiple times. Instead, the benchmarking technique may be configured to account for each pairing strategy. For example, each pairing strategy may be credited in a manner that fairly accounts for the extent to which it may have contributed to the series of contact interactions that resulted in a final outcome or resolution of the contact's needs.

Figure 8:
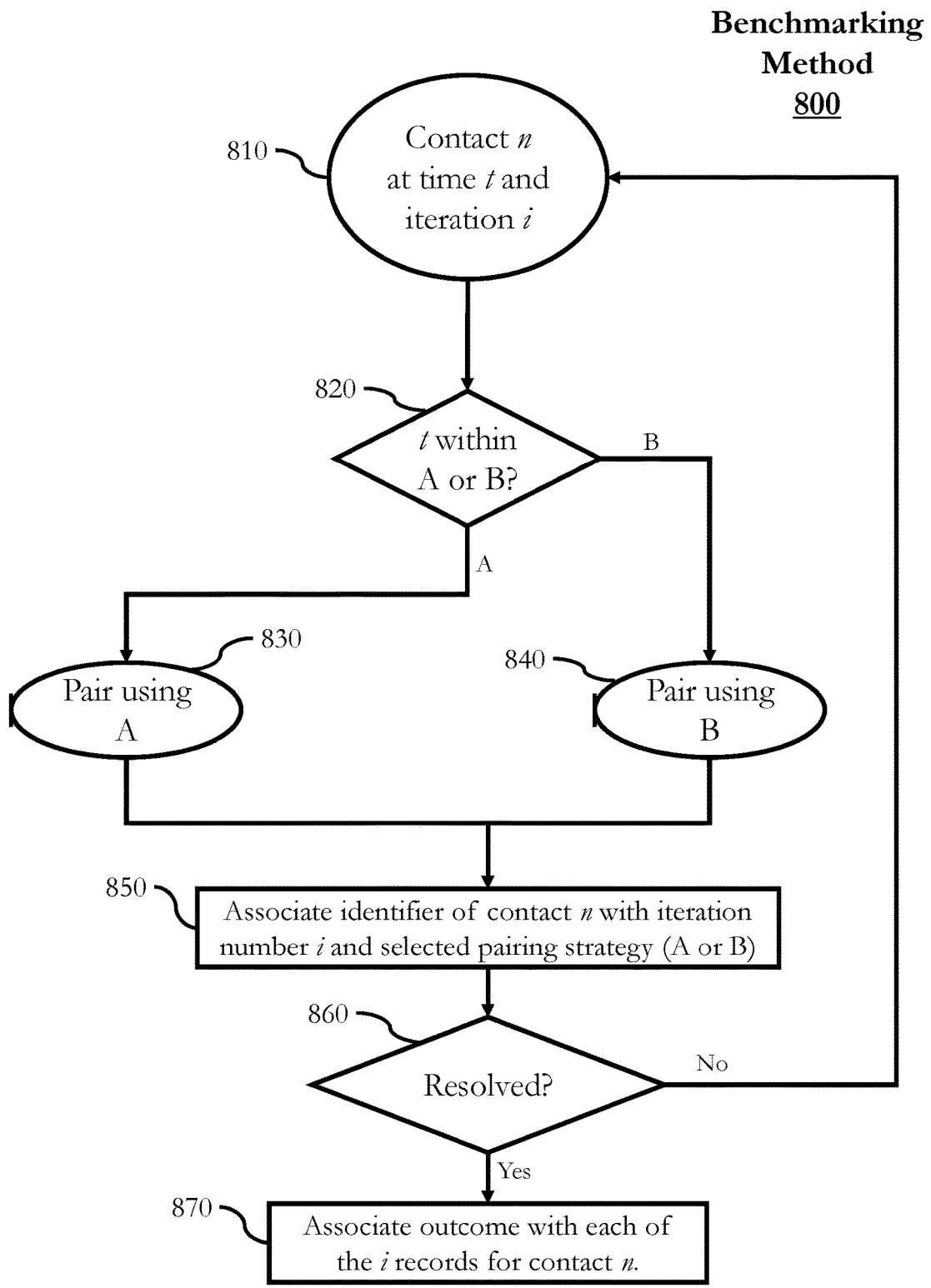
FIG. 8 shows a flow diagram of a benchmarking method according to embodiments of the present disclosure.

FIG. 8 shows a flow diagram of benchmarking method 800 according to embodiments of the present disclosure. Benchmarking method 800 may begin at block 810.

At block 810, a contact (e.g., "contact n") arrives at the contact center at a particular time t and a particular iteration i. For example, if this time is the first time contact n has contacted the contact center about this particular need, it will be designated the first iteration (i.e., i=1), or this time may be the second (i=2), third (i=3), . . . $i^{th}$ time calling. Benchmarking method 800 may proceed to block 820.

At block 820, time may be used to determine which pairing strategy to use for contact n. In these embodiments, even if this is a subsequent arrival such that i>1, the pairing strategy selected for any prior pairing need not influence the current pairing. In this example, arrival time t may be used. If contact n arrived during a time period when the benchmarking system is pairing using strategy A, benchmarking method 800 may proceed to block 830 for subsequent pairing using strategy A. Similarly, if contact n arrived during a time period when the benchmarking system is pairing using strategy B, benchmarking method 800 may proceed to block 840 for subsequent pairing using strategy B. In some embodiments, pairing strategy A may be a behavioral pairing strategy (behavioral pairing "ON"), and pairing strategy B may be a different pairing strategy such as FIFO or performance-based routing (behavioral pairing "OFF").

At blocks 830 and 840, contacts may be paired to available agents using pairing strategies A or B, respectively. In some embodiments, more than two pairing strategies may be used. Once paired, the contact may be routed or otherwise connected to the available agent within the contact center system. As described above with respect to benchmarking methods 400 (FIG. 4) and 500 (FIG. 5), the agent may create a record of the contact-agent interaction, and the contact center system may also create or modify this record. Benchmarking method may proceed to block 850.

At block 850, an identifier to the selected pairing strategy (e.g., A or B) may be associated with an identifier of the current iteration i for the contact n within the record (or set of records) created at block 830 or 840. As described above with respect to benchmarking methods 400 and 500, this association may occur simultaneously with the creation of the contact-agent interaction record, or it may be matched at a later time with other records created by a benchmarking module or other module.

In some embodiments, benchmarking method 800 may proceed to block 860. At block 860, it may be determined whether the needs of contact n have been resolved. If the needs of contact n have not yet been resolved, or in other embodiments where the outcome of a given call may be matched at a later time, benchmarking method 800 may end or return to block 810 for the next contact to arrive. If the needs of contact n have been resolved, benchmarking method 800 may proceed to block 870.

At block 870, the final outcome (e.g., a mortgage loan was closed or declined, a sale was completed or canceled) may be associated with the record or records for each of the i iterations for contact n. Table V shows an example set of records for four contacts W, X, Y, and Z, who each contacted the contact center system three times before reaching a final resolution. In real-world scenarios, there may be many more contacts, and the number of contact interactions needed to resolve an individual contact's needs may vary from one contact to the next, ranging from just one contact interaction to three or even more.

TABLE V

| Iteration i | Contact W | Contact X | Contact Y | Contact Z |
|---|---|---|---|---|
| 1 | A | B | A | B |
| 2 | B | B | A | A |
| 3 | A | A | B | B |
| Outcome | Sale | Sale | Sale | No Sale |

As shown in Table V, and as described above with respect to block 850, the identifiers for the contact (W, X, Y, or Z) and the iteration (1, 2, or 3) are associated with the selected pairing strategy used for the given contact interaction (A or B). For contact W, iteration 1 was paired with strategy A, iteration 2 was paired with strategy B, and iteration 3 was paired with strategy A. For contact X, iteration 1 was paired with strategy B, iteration 2 was paired with strategy B, and iteration 3 was paired with strategy A. For contact Y, iteration 1 was paired with strategy A, iteration 2 was paired with strategy A, and iteration 3 was paired with strategy B. For contact Z, iteration 1 was paired with strategy B, iteration 2 was paired with strategy A, and iteration 3 was paired with strategy B.

Also shown in Table V, and as described above with respect to block 870, the final outcome for the contact may be associated with the records for each iteration. Contacts W, X, and Y completed sales. Contact Z did not complete a sale. In some embodiments, a "no sale" determination may be made if the contact explicitly states that it does not intend to complete a sale. In other embodiments, the contact center system may make a "no sale" determination after a predetermined number of iterations have occurred without completing a sale, or after a predetermined amount of time has passed since the most recent iteration without completing a sale. In some situations, such as when a contact has resolved a technical support or customer service need, the final resolution may be a customer satisfaction survey result or score.

Following block 870, benchmarking method 800 may end. In some embodiments, benchmarking method 800 may return to block 810, waiting for another contact to arrive (e.g., a different contact, or contact n with a new need).

On a continuous, hourly, daily, weekly, etc. basis, a difference in performance among pairing strategies may be determined. In some embodiments, the performance difference may be stratified for each iteration (the performance difference for all contact interactions of iteration i=1; all contact interactions of iteration i=2; etc.). Although a final resolution may not have been reached after the first contact interaction (when i=1), the benchmark for the first stratum may be measured using the final outcome, which was previously associated with that first contact interaction either at block 870 or matched at a later time with other contact center system records.

Using the example shown in Table V, for the benchmark for the first stratum (i=1), two contacts (W and Y) were paired using strategy A for the first iteration, and both had final outcomes resulting in a sale, achieving a conversion rate of 100%. The other two contacts (X and Z) were paired using strategy B for the first iteration, and only one (X) had a final outcome resulting in a sale, achieving a conversation rate of 50%.

Similarly, for the benchmark for the second stratum (i=2), two contacts (Y and Z) were paired using strategy A for the second iteration, and only one (Y) had a final outcome resulting in a sale, achieving a conversation rate of 50%. The other two contacts (W and X) were paired using strategy B for the second iteration, and both had final outcomes resulting in a sale, achieving a conversion rate of 100%.

Finally, for the benchmark for the third stratum (i=3), two contacts (W and X) were paired using strategy A for the third iteration, and both had final outcomes resulting in a sale, achieving a conversion rate of 100%. The other two contacts (Y and Z) were paired using strategy B for the third iteration, and only one (Y) had a final outcome resulting in a sale, achieving a conversion rate of 50%.

These strata and conversion rates are shown in Table VI below:

TABLE V

| Iteration/Stratum i | Strategy A | Strategy B |
| --- | --- | --- |
| 1 | 100% | 50% |
| 2 | 50% | 100% |
| 3 | 100% | 50% |

After determining performances or performance differences between each pairing strategy for each iteration (based on the final outcomes), the performance differences may be combined. In some embodiments, the performance differences may be averaged. In the example of Table V, the average conversion rate for strategy A is approximately 83%, and the average conversion rate for strategy B is approximately 67%. Strategy A performed almost 24% better than strategy B. In some embodiments, the performance differences may be normalized based on the total number of contact interactions for each strategy for each iteration.

In some embodiments, some iterations may be weighted more or less than other iterations. For example, it may be determined (by, e.g., contact center system administrators or other business leaders) that the first contact interaction is the most critical to determining whether or to what extent a desirable final outcome will be achieved. In other situations, it may be determined that the final contact interaction is the most critical. In these situations, the more critical strata may be weighted more heavily than less critical strata in the final benchmarking result.

At this point it should be noted that behavioral pairing in a contact center system in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with behavioral pairing in a contact center system in accordance with the present disclosure as described above. Alternatively, one or more processors operating in accordance with instructions may implement the functions associated with behavioral pairing in a contact center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for benchmarking pairing strategies in a contact center system comprising:
   cycling, by at least one computer processor communicatively coupled to and configured to operate in the contact center system, among at least two pairing strategies including a first pairing strategy and a second pairing strategy;
   determining, by the at least one computer processor, a first contact that was paired in a sequence of contact interactions to reach a final outcome during a final contact interaction of the sequence of contact interactions, wherein at least one contact interaction of the sequence of interactions was paired using the first pairing strategy, and wherein the final contact interaction was paired using the second pairing strategy;
   attributing, by the at least one computer processor, a first portion of credit for the final outcome to the first pairing strategy and a second portion of credit for the final outcome to the second pairing strategy;
   determining, by the at least one computer processor, a difference in performance between the at least two pairing strategies based at least in part on the first and second portions of credit attributed to the first and second pairing strategies; and
   outputting, by the at least one computer processor, the difference in performance between the at least two pairing strategies for benchmarking the at least two pairing strategies, wherein the performance difference demonstrates that using the first pairing strategy instead of another of the at least two pairing strategies improves performance of the contact center system.

2. The method of claim 1, wherein a final outcome indicator for each of the sequence of contact interactions indicates the final outcome determined from the final contact interaction of the sequence of contact interactions.

3. The method of claim 1, wherein a pairing strategy indicator for each of the sequence of contact interactions indicates which of the at least two pairing strategies was used for pairing each of the sequence of contact interactions.

4. The method of claim 1, wherein an iteration indicator for each of the sequence of contact interactions indicates a sequence iteration number in which each of the sequence of contact interactions occurred.

5. The method of claim 4, wherein determining the difference in performance further comprises:
   determining, by the at least one computer processor, an intermediate measure of performance for each set of contact interactions indicated by a same sequence iteration number; and
   determining, by the at least one computer processor, an overall difference in performance based on a combination of the intermediate measure of performance for each set of contact interactions for all sequence iteration numbers.

6. The method of claim 5, wherein the combination is a weighted average of the intermediate measure of performance for each set of contact interactions.

7. The method of claim 1, further comprising:
   determining, by the at least one computer processor, each arrival time of the at least one contact; and
   selecting, by the at least one computer processor, one of the at least two pairing strategies for each arrival time of the at least one contact based on each arrival time and irrespective of any prior pairings for the at least one contact.

8. A system for benchmarking pairing strategies in a contact center system comprising:
   at least one computer processor communicatively coupled to and configured to operate in the contact center system, wherein the at least one computer processor is further configured to:
      cycle among at least two pairing strategies including a first pairing strategy and a second pairing strategy;
      determine a first contact that was paired in a sequence of contact interactions to reach a final outcome during a final contact interaction of the sequence of contact interactions, wherein at least one contact interaction of the sequence of interactions was paired using the first pairing strategy, and wherein the final contact interaction was paired using the second pairing strategy;
      attribute a first portion of credit for the final outcome to the first pairing strategy and a second portion of credit for the final outcome to the second pairing strategy;
      determine a difference in performance between the at least two pairing strategies based at least in part on the first and second portions of credit attributed to the first and second pairing strategies; and
      output the difference in performance between the at least two pairing strategies for benchmarking the at least two pairing strategies, wherein the performance difference demonstrates that using the first pairing strategy instead of another of the at least two pairing strategies improves performance of the contact center system.

9. The system of claim 8, wherein a final outcome indicator for each of the sequence of contact interactions indicates the final outcome determined from the final contact interaction of the sequence of contact interactions.

10. The system of claim 8, wherein a pairing strategy indicator for each of the sequence of contact interactions indicates which of the at least two pairing strategies was used for pairing each of the sequence of contact interactions.

11. The system of claim 8, wherein an iteration indicator for each of the sequence of contact interactions indicates a sequence iteration number in which each of the sequence of contact interactions occurred.

12. The system of claim 11, wherein the processor, configured to determine the difference in performance, is further configured to:
   determine an intermediate measure of performance for each set of contact interactions indicated by a same sequence iteration number; and
   determine an overall difference in performance based on a combination of the intermediate measure of performance for each set of contact interactions for all sequence iteration numbers.

13. The system of claim 12, wherein the combination is a weighted average of the intermediate measure of performance for each set of contact interactions.

14. The system of claim 8, wherein the processor is further configured to:
   determine each arrival time of the at least one contact; and
   select one of the at least two pairing strategies for each arrival time of the at least one contact based on each arrival time and irrespective of any prior pairings for the at least one contact.

15. An article of manufacture for benchmarking pairing strategies in a contact center system comprising:
   a non-transitory computer processor readable medium; and
   instructions stored on the medium;
   wherein the instructions are configured to be readable from the medium by at least one computer processor communicatively coupled to and configured to operate in the contact center system and thereby cause the at least one computer processor to operate so as to:
      cycle among at least two pairing strategies including a first pairing strategy and a second pairing strategy;
      determine a first contact that was paired in a sequence of contact interactions to reach a final outcome during a final contact interaction of the sequence of contact interactions, wherein at least one contact interaction of the sequence of interactions was paired using the first pairing strategy, and wherein the final contact interaction was paired using the second pairing strategy;
      attribute a first portion of credit for the final outcome to the first pairing strategy and a second portion of credit for the final outcome to the second pairing strategy;
      determine a difference in performance between the at least two pairing strategies based at least in part on the first and second portions of credit attributed to the first and second pairing strategies; and
      output the difference in performance between the at least two pairing strategies for benchmarking the at least two pairing strategies, wherein the performance difference demonstrates that using the first pairing strategy instead of another of the at least two pairing strategies improves performance of the contact center system.

16. The article of manufacture of claim 15, wherein a final outcome indicator for each of the sequence of contact interactions indicates the final outcome determined from the final contact interaction of the sequence of contact interactions.

17. The article of manufacture of claim 15, wherein a pairing strategy indicator for each of the sequence of contact interactions indicates which of the at least two pairing strategies was used for pairing each of the sequence of contact interactions.

18. The article of manufacture of claim 15, wherein an iteration indicator for each of the sequence of contact interactions indicates a sequence iteration number in which each of the sequence of contact interactions occurred.

19. The article of manufacture of claim 18, wherein the processor, caused to operate so as to determine the difference in performance, is further caused to operate so as to:
   determine an intermediate measure of performance for each set of contact interactions indicated by a same sequence iteration number; and
   determine an overall difference in performance based on a combination of the intermediate measure of performance for each set of contact interactions for all sequence iteration numbers.

20. The article of manufacture of claim 19, wherein the combination is a weighted average of the intermediate measure of performance for each set of contact interactions.

* * * * *